(12) United States Patent
Markell et al.

(10) Patent No.: US 6,270,609 B1
(45) Date of Patent: Aug. 7, 2001

(54) HARD DISK DRIVE FILTER

(75) Inventors: Craig G. Markell, White Bear Twp.; David J. Andrews, Rosemount, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/228,430

(22) Filed: Jan. 11, 1999

(51) Int. Cl.$^7$ .................................................. B29C 53/36
(52) U.S. Cl. ......................... 156/218; 156/245; 156/293; 156/303.1; 264/266; 264/DIG. 48; 428/35.3; 428/36.1; 428/36.5
(58) Field of Search ............................. 96/147; 156/62.2, 156/203, 218, 303.1, 293, 245; 264/DIG. 48, 109, 119, 125, 126, 128, 266; 428/35.2, 35.3, 36.1, 36.5

(56) References Cited

U.S. PATENT DOCUMENTS

| | | |
|---|---|---|
| 3,091,550 | 5/1963 | Doying . |
| 3,474,600 | 10/1969 | Tobias . |
| 3,516,885 | 6/1970 | Sexstone et al. ............. 156/203 |
| 4,061,807 | 12/1977 | Shaler et al. ................ 428/36 |
| 4,386,947 | 6/1983 | Mizano et al. ............... 55/387 |
| 4,664,683 | 5/1987 | Degen et al. ................ 55/387 |
| 4,665,050 | 5/1987 | Degen et al. ................ 502/402 |
| 4,830,643 | 5/1989 | Sassa et al. ................. 55/316 |
| 5,033,465 | 7/1991 | Braun et al. ............. 128/205.27 |
| 5,069,694 | 12/1991 | Cullen et al. ............... 55/318 |
| 5,078,132 | 1/1992 | Braun et al. ............. 128/206.12 |
| 5,332,426 | 7/1994 | Tang et al. .................. 96/153 |
| 5,377,474 | 1/1995 | Kovacs et al. ............... 53/64 |
| 5,500,038 | 3/1996 | Dauber et al. ............... 96/135 |
| 5,636,525 | 6/1997 | Riemenschneider ........... 62/474 |
| 5,693,124 | 12/1997 | Dobson et al. .............. 96/147 |
| 5,746,043 | 5/1998 | Terminella et al. ........... 53/451 |
| 5,802,868 | 9/1998 | Riemenschneider ........... 62/474 |
| 5,817,263 | * 10/1998 | Taylor ..................... 264/113 |
| 5,852,920 | 12/1998 | Linkiewicz ................. 53/551 |

FOREIGN PATENT DOCUMENTS

| | | | |
|---|---|---|---|
| 0 491 175 A2 | 11/1991 | (EP) | ............... B60H/3/06 |
| 1 390 668 | 6/1971 | (NL) | ............... B29F/5/00 |
| WO 98/41989 | 9/1998 | (WO) | ............. G11B/33/14 |

* cited by examiner

Primary Examiner—Michael W. Ball
Assistant Examiner—Gladys Piazza
(74) Attorney, Agent, or Firm—Gary L. Griswold; Robert W. Sprague; William J. Bond

(57) ABSTRACT

There is provided a method of forming a shaped sorbent filter preferably having a three dimensional shape.

The method generally entails:
a) providing porous flexible tubular web structure having two open ends;
b) sealing a first end of the tubular web structure;
c) filling the sealed tubular web structure with flowable filter material of sorbent material and binder;
d) sealing the opposite open end of the tubular web material; and
e) heating the tubular web structure to active the binder and form a shaped sorbent filter. The tubular web structure preferably is deformed while it is heated so that there is provided at least one permanently deformed bending portion. The invention method provides a simple effective process for forming complex overwrapped shaped small sorbent filters for use in the electronics industry.

13 Claims, 5 Drawing Sheets

HARD DISK DRIVE FILTER

BACKGROUND AND FIELD OF THE INVENTION

This invention relates to sorbent filter devices for removing contaminants from a confined environment such as computer disk drives and other electrical or optical devices.

Many electronic and/or optical devices are extremely sensitive to environmental contaminants particularly if the contaminants are gaseous in nature. Typically, the enclosures containing these sensitive devices are sealed, however, not hermetically sealed. Even if hermetic sealing were attempted, the devices would still be subjected to internally generated contaminants from out-gassing. As such, there is a need to remove harmful gaseous contaminants, whether the contaminants be internally generated to externally infiltrate into the enclosures, and whether the contaminants are organic, corrosive vapors, moisture, or the like. Also, as these devices are often small with limited available space it is desirable to provide sorbent filters which are small, yet can fit in available spaces and not shed particulates. It is known in the art to employ sorbent "breather" filters in enclosures of the above type. Known approaches to breather filters are discussed in U.S. Pat. No. 5,500,038 which states "Sorbent breather filters used to keep particulates and vapors from entering enclosures are well known. These can be made by filling a cartridge of polycarbonate, acrylonitrile butadiene styrene (ABS), or similar material with sorbent and securing filter media on both ends of the cartridge. Examples of such filters are described in U.S. Pat. No. 4,863,499 issued to Osendorf, (an anti-diffusion chemical breather assembly for disk drives with filter media having a layer with impregnated activated charcoal granules); U.S. Pat. No. 5,030,260, issued to Beck et al. (a disk drive breather filter including an assembly with an extended diffusion path); U.S. Pat. No. 5,124,856, issued to Brown et al., (a unitary filter medium impregnated with activated carbon fibers to protect against organic and inorganic pollutants)."

This patent goes on to indicate that these known types of breather filters are unacceptable. The patent further describes the prior art approach of U.S. Pat. No. 4,830,643 where granular absorbent materials are filled in an expanded polytetrafluoroethylene tube (PTFE). This approach is also criticized in the '038 patent for a number of reasons including the possibility that the loose fill can be spilled if the container tube is broken. As such, the '038 patent proposes starting with a sorbent core material where the sorbent particles are immobilized by being held in a matrix, such as an impregnated nonwoven molded article with a binder or a sorbent particle filled polytetrafluoroethylene sheet. The immobilized carbon is then overwrapped, such as by a cigarette wrap, or filled into a preformed tube where end seals are provided by a potting technique.

A similar approach is proposed in PCT Appln. WO 98/41989, which proposes a shaped molded carbon article formed by compression molding a particulate absorbent with a mixed-in binder. The compression molded tablet or brick of absorbent material and binder can then be placed in a preformed container or pouch.

Compression molded or otherwise immobilized carbon particles, and other sorbents, formed into a preformed structure is well known in other fields as well. For example, in U.S. Pat. No. 3,474,600 (Tobias) molded tablets of absorbent carbon are formed under heat and pressure to form cigarette filters or cylindrical material for use in packed beds; U.S. Pat. No. 4,665,050 (Degen et al.) describes a specific process for molding sorbents with a binder to form monolithic shapes such as cylinders, a similar approach is also described in U.S. Pat. Nos. 4,664,683; 5,033,465 and 5,078,132 describe shaped structures formed by immobilized carbon, such as filter cakes for use in respirators; U.S. Pat. No. 5,332,426 describes forming various shaped structures from agglomerated sorbent granules where the agglomerate granules are formed with a plurality or sorbent particles which agglomerates are subsequently formed into structures by bonding together the agglomerates with the binder particles of the agglomerates; U.S. Pat. No. 3,091,550 describes forming a monolithic structure of activated carbon by use of emulsion binder or a binder suspended in an aqueous emulsion; U.S. Pat. No. 4,386,947 describes forming a extrudable dough-like mixture of activated carbon blended with a cellulosic material, water, varnish and an imide resin, where the dough is formed into a predetermined structure and heated to form a monolithic structure; U.S. Pat. No. 4,061,807 describes distributing a binder on an absorbent by mixing in a small amount of water, which is formed into a monolithic structure in a mold and is subsequently heated to drive off the water and activate the binder, UK Pat. 1,390,668 describes forming a variety of shapes by mixing a heated adsorbent with a binder forming the predetermined structure followed by a subsequent heating step to set the binder. Monolithic sorbent particle structures as such are very well known in the art. Often, the formed monolithic structures of sorbent particles and binders are subsequently overwrapped to contain any flaked off particles or the like, such as described in U.S. Pat. No. 5,500,038 and PCT WO 98/41989. This provides a further level of security, which is desirable where carbon or other particles are potentially extremely dangerous, such as in sensitive electronic components or where carbon or other particles can present a health concern. However, it is often quite difficult to overwrap a structure in a manufacturing process, particularly where the overwrap must necessarily cover all portions of the formed structure. Generally, where overwrapping is done, the monolithic structures are simple blocks or other symmetrical linear structures for ease of manufacture. However, with electronic enclosures such as disk drives and the like, the available space is generally quite limited and it is frequently desirable to provide for sorbent filters of complex shapes to take up as much available space as possible, or to take full advantage of the available space, or provide desirable flow patterns. As such, the invention is directed at a novel method of forming complex shaped sorbent filters of overwrapped immobilized sorbents in a simple and economical manner.

BRIEF SUMMARY OF THE INVENTION

The invention is directed at a method of forming a sorbent filter preferably having a three dimensional shape where the method includes the steps of a) providing porous flexible tubular web structure having two open ends;

b) sealing a first end of the tubular web structure;

c) filling the sealed tubular web structure with flowable filter material or sorbent material and binder;

d) sealing the opposite open end of the tubular web material; and e) heating the filled and sealed tubular web structure to activate the binder and form a shaped sorbent filter.

Preferably, while or after the binder is activated, the tubular web structure is deformed to create a bending portion resulting in a three dimensional shaped sorbent filter.

By "three dimensional" it is meant that the shaped sorbent filter, of an end sealed porous tubular web structure, has at least one bending portion along its length so that it is not a linear structure. Generally the bending portion has an angle of at least 10 degrees and the tubular web structure is filled with an immobilized filter material blend of sorbent and binder particles.

DETAILED DESCRIPTION OF THE INVENTION

Figure 3:
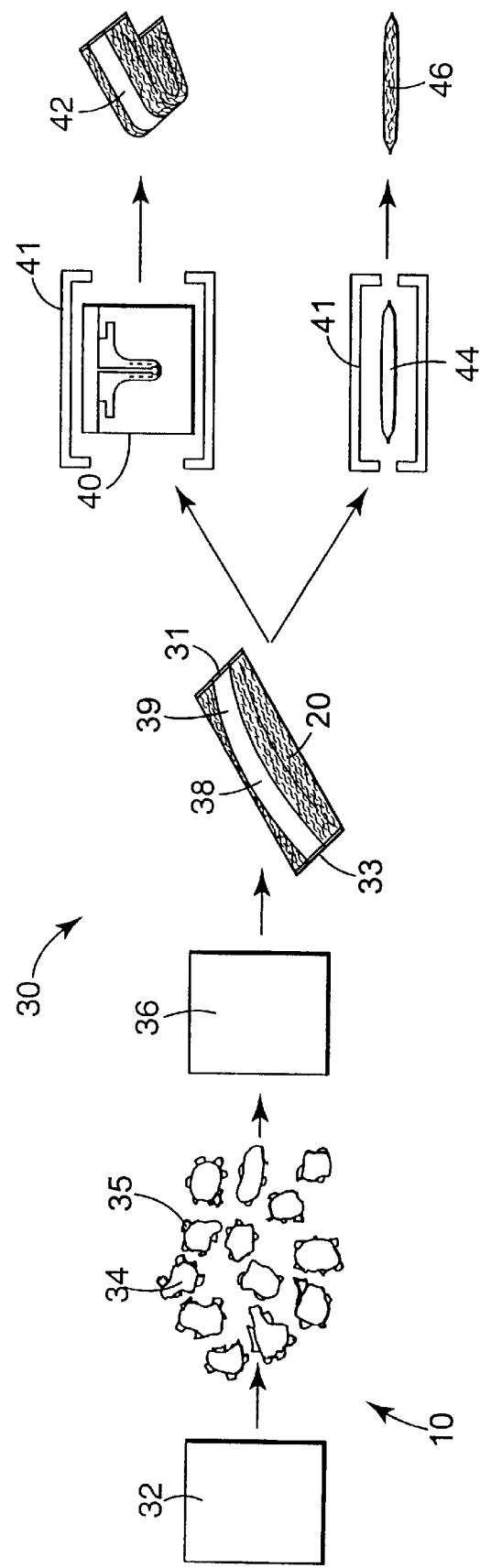
FIG. 3 is a schematic illustration of the invention process.

As shown in FIG. 3, the sorbent filters of the invention are formed by a process 10 of filling a preformed flexible tubular web structure with a flowable filter material blend of sorbents and binder and sealing the ends of the tubular structure. This forms a precursor sorbent filter. The filled precursor sorbent filters are then formed into the invention sorbent filters by heating the precursor sorbent filter to activate the binder material immobilizing the filter material blend within the flexible tubular structure. This heating is preferably proceeded by or is simultaneous with a deformation or molding step to create a three dimensional sorbent filter. The flowable filter material blend is preferably premixed 32 to form sorbents 34 coated with a particulate binder 35. The tubular web structure 38 material is porous and has two ends which in the formed sorbent filter are sealed, preferably by heat sealing. Other known methods of sealing off the ends of a tubular web structure, as known in the art, are also possible. In order to fill the flexible tubular web structure without contamination of the ends seals, generally one end of the tubular structure is presealed. The flowable filter material blend of preferably particulate sorbents and binder is then added into the opposing open end, which opposing end is then sealed.

A preferred method of forming sorbent filters employs a vertical form, fill and seal machine 36, which machines are often used to package flowable materials. The flowable filter material blend or sorbent and binder particulates is fed into the vertical form fill and seal machine. For example, using such a machine a flat web of porous flexible web material is unwound from a roll and formed into a continuous tube in a tube forming section by sealing the longitudinal edges on the web together, such as by forming a lap seal 39 or a fin seal. The tube thus formed is pulled vertically downwards to a filling station. The tube is then collapsed across a transverse cross-section of the tube, the position of such cross-section being at a sealing device below the filling station. A transverse heat seal 31 is made, by the sealing device, at the collapsed portion of the tube, thus making an continuous seal across the tube. The sealing device generally comprises a pair of jaws. After making the transverse seal, but before the jaws of the sealing device are opened, a pre-set quantity of particulate material is allowed to enter the tube, at the filling station, and fill the tube upwardly from the transverse seal. The tube is then allowed to drop a predetermined distance under the influence of the weight of the material in the tube or by mechanical means such as the jaws or other means. The jaws of the sealing device are closed again, thus collapsing the tube at a second transverse section usually just above the air/material interface in the tube. The sealing device seals 33 and severs the tube transversely at said second transverse section. The material-filled portion of the tube is now in the form of an elongated pillow shaped pouch of a filled sorbent filter 38, the pouch 38 contains the loose unconsolidated filter blend. Thus, the sealing device has heat sealed the top of the filled pouch, heat sealed the bottom of the next-to-be formed pouch and separated the filled pouch from the next-to-be formed pouch, all in one operation.

Figure 1:
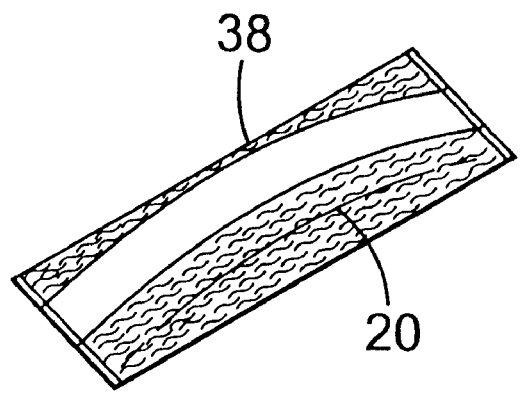
FIG. 1 is a perspective view of a form, fill and sealed sorbent filter prior to deformation.
Figure 2:
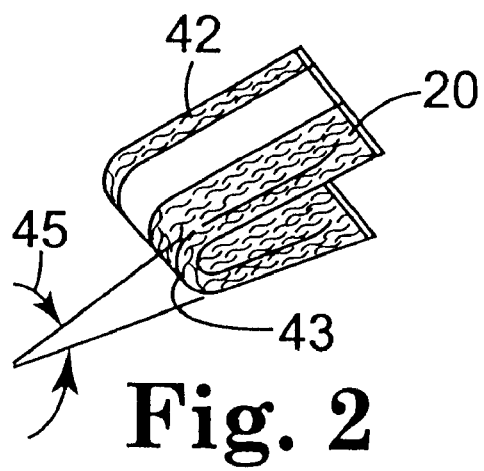
FIG. 2 is a perspective view of a form fill and sealed sorbent filter after deformation into a three dimensional shape.

The filled flexible tubular structure 38 precursor sorbent filter as shown in FIGS. 1 and 3 is then heat set and preferably deformed or molded 44 into a complex three dimensional shaped structure such as a u-shape 42, as shown in FIGS. 2 or 3, or other shapes such as a s-shape, a v-shape, a w-shape or the like or a flat form 46. The heat set is to activate the binder 35 and immobilize the particulate sorbents 34. This deformation or molding step 40 can be carried out prior to, simultaneous with, or subsequent to the heating step 41 provided that the deformation and activation (i.e. prior to the binder has set by thermosetting, or solidifying, or the like) of the binder are coextensive over some period of time to allow the deformation to become permanent. Generally, the filled tubular structure 38 is filled to about 50 to 90 percent of its maximum capacity to permit the deformation step to be completed without rupture of the end seals (31 and 33) but still fill the tubular structure along its full length. With more complex shapes the percent to which the tubular structure is filled will be less, possibly even below the above range due to internal volume loss created by bending portions of the complex shape.

The sorbent material 34 can be any suitable sorbent which is capable of removing contaminants from air and is flowable. Particulate adsorbents are preferred, but absorbents are also contemplated, as are other shapes such as fibrous sorbents, provided that the sorbent material is still flowable.

The sorbent material used, as a particulate or other flowable form, is preferably an adsorbent activated carbon or silica gel. The adsorbent carbon particles are well known and described, for examples, in U.S. Pat. No. 4,061,807. The sorbent particle materials can be as small as 100 microns, but will typically have a size ranging from about 0.2 mm to about 2 mm, and preferably from about 0.4 to 0.7 mm. It is not necessary to have sorbent material of uniform size, rather the sorptive material size can range broadly.

The bonding material used is generally a particulate thermoplastic polymer binder 35 having a softening temperature below that of the sorptive material 34 and the porous flexible web material 20. The average particulate size of the binder material should be less than that of the sorptive material. Generally the binder particle size will be about at least 20% less than the average sorptive particles size, and preferably about at least 90% less than the average sorbent particle size. However, it is generally preferred that the mean binder particle size less than about 250 microns, and preferably less than about 200 microns. Again, it is possible to use binder particles of a wide range of particle sizes and shapes provided that the average particle size is less than that of the sorptive material. Suitable thermoplastic polymer binders can be formed by polymers such as polyolefins, polyacrylates, polyarenes, polyamides, or thermoplastic elastomers such as polyurethanes, polydiene polymers and block copolymers, or the like. Generally, the selection of the thermoplastic binder is limited by softening point temperatures considerations and the ability to form the thermoplastic material into a fine binder particle. For example, higher softening point binders are preferred for higher service temperature applications. Also some binders are too tacky to form fine particles unless ground and stored under extreme temperature conditions, which is economically not feasible.

The binder particle 35 will typically constitute less than 40 weight percent of the flowable filter material 10, preferably less than 25 weight percent, and most preferably less than about 15 weight percent of the filter material 10.

The binder and sorbent material are preferably preblended to form the flowable filter material, with the binder adhered to the sorbent material as shown schematically as 32 in FIG. 3. This is preferably done by preheating the sorbent material to a temperature about 5 to 10° C. above the softening temperature of the binder material. The heated sorbent material is then placed in a mixing device and the binder materials added without any consolidation pressure. It is possible to form agglomerates but preferably agglomerates are broken down by shearing elements provided in the mixing device.

The porous flexible web material 20 used to form the tubular structure is preferably a non-shedding nonwoven web such as a spunbonded web or like consolidated nonwoven web. Preferably the web material is formed of or contains a heat sealable thermoplastic. The flexible web material 20 can also be a porous film such as a polytetrafluorethylene film or a non-shedding filter paper or laminate of any of the above. Generally, the porous web material contains only loose particulate material that may shake loose as well as permit the rapid penetration of gaseous contaminants.

Figure 7:
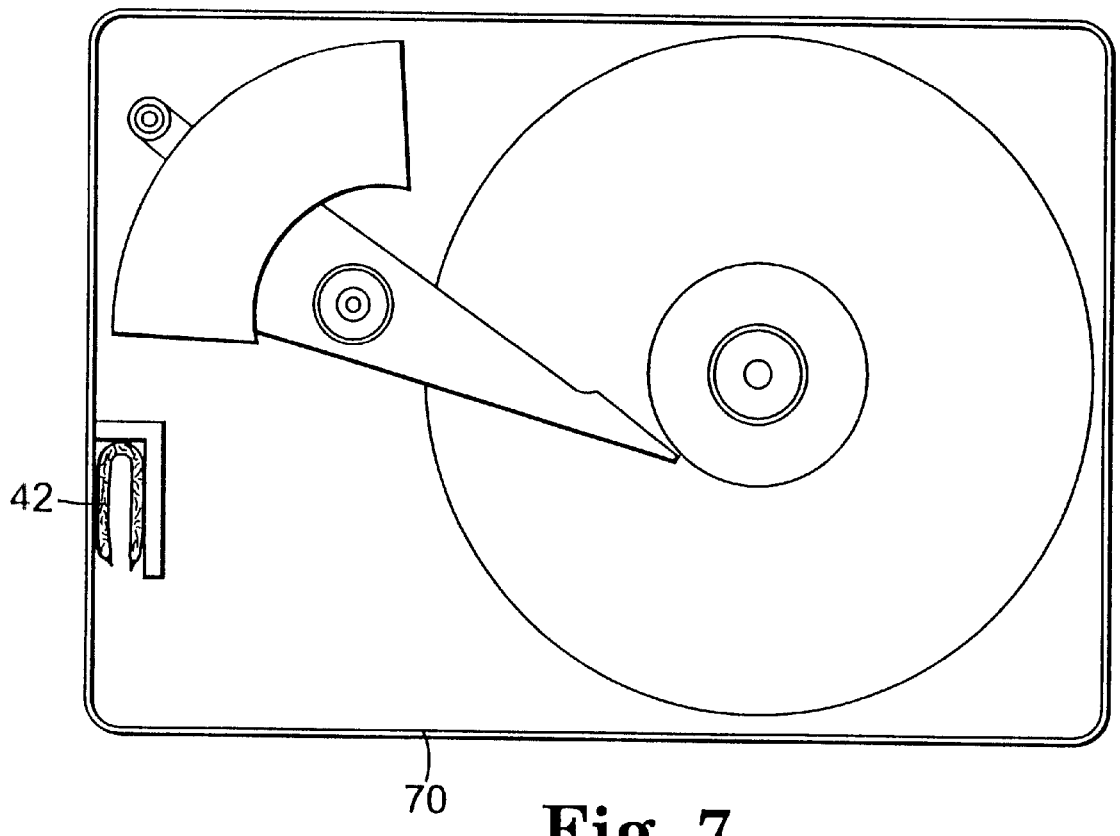
FIG. 7 is a top cutaway view of a deformed three dimensionally shaped sorbent filter of the invention in use in a computer disk drive.

The sorbent filter can have a three dimensional shape adapted to the available space provided in the intended electronic device 70 or the like as shown in FIG. 7 where the three dimensional sorbent filter 42 is fit into an available space in a hard disk drive. The sorbent filter 38 or 42 generally has an effective width (taken at the end seams) of less than 3 cm, preferably less than 2 cm, and a length of from less than 10 cm, preferably less than 6 cm. However, the length of the sorbent filter device is not critical. The effective width effects the ability to form the precursor sorbent filter 38 into suitable shapes. With smaller effective widths bending of the filled tubular web material 20 of the precursor sorbent filter 38 is easier, particularly when there are multiple bending portions that are closely spaced. The formed three dimensional filter device 42 is generally non-linear with at least one bending portion 43 of angle 45 of at least 10 degrees, preferably at least 45 degrees. The bending portions 43, when subject to deformation, have a shape retention (as defined below) of at least 35 percent, preferably at least 40 percent. Shape retention represents the ability of the filters to retain its shape when deformed. The filters as such exert a force that helps keep the filters in place by a friction fit when inserted into a space that deforms the filter from its as-formed shape.

EXAMPLES

Test Procedures

Shape Retention

Figure 4:
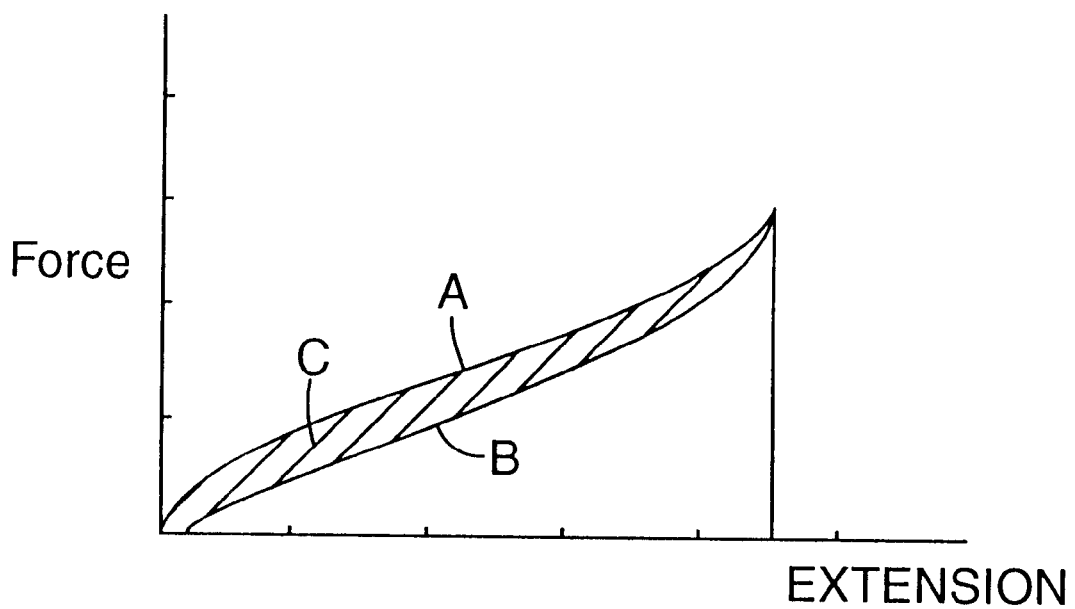
FIG. 4 is graph of load verses extension curve of an invention sorbent filter.

Resiliency of a sorbent filter structure was evaluated by determining the available restoring energy of the filter according to procedures defined in the User's Guide, Instron Series XII Software, Issue C, September 1989, which utilizes a one kilogram cell on an Instron™ #4302 test apparatus (available from Instron Corp., Canton, Mass.). U-shaped filters as shown in FIG. 2, the preparation of which is described below, were placed between a 6.4 mm (0.25 inch) diameter probe and the base of the load cell (initial gap setting of 12 mm) such that the probe contacted the open end of the upper leg of the filter, the probe was advanced at a rate of 0.1 mm/sec over a distance of 4.5 mm followed by retraction to its original position at the same rate while the restoring energy for the body was monitored over both the loading and unloading cycles, and the available energy for the body was calculated by the instrumentation software supplied. The hysteresis loss C as a percentage of the loading energy or force (shown in FIG. 4) is calculated according to the equation:

(Loading Energy) (A)-(Unloading Energy (B))/(Loading Energy)× 100 percent

This shape retention reported as a percentage in Table 2 is calculated by subtracting the hysteresis loss calculated by the above equation from 100 percent.

Moisture Adsorption

Duplicate sorbent filter samples were subjected to 90% relative humidity (RH) at 72° F. for 3 days while monitoring weight gain. Moisture adsorption is reported as the percent weight gain based on the weight of the sorbent filter.

Carbon Tetrachloride Adsorption

Duplicate sorbent filter samples were placed in a sealed container having a saturated carbon tetrachloride atmosphere, sustained by open beakers containing the solvent, for three days at ambient temperature while monitoring weight gain of the filters. Carbon tetrachloride adsorption is reported as the percent weight gain based on the weight of the sorbent filters.

Sorbents

Beaded Activated Carbon (BAC G-70R)—available from Kreha Corporation of America, Beaverton, Oreg.

$K_2CO_3$ Treated Beaded Activated Carbon—BAC G-70R carbon (8.0 kg) was mixed with deionized water (8.0 kg) containing 0.8 wt. % $K_2CO_3$, the mixture was blended for approximately one-half hour and dried in a vacuum Rotacone™ vacuum drier (available from Paul O. Abbe', Inc., Little Falls, N.J.) for approximately 6½ hours.

Activated Carbon GAC type GG—(Carbon Coal, 25×45 screen size (0.71×0.35 mm), available from Kuraray Chemical Co., Ltd., Osaka, Japan).

Activated Carbon GAC type GG—(Carbon Coal, 16×35 screen size (1.19×0.5 mm), available from Kuraray Chemical Co., Ltd.).

Activated Carbon GAC type GG—(Carbon Coal, 12×20 screen size (1.68×0.84 mm), available from Kuraray Chemical Co., Ltd.).

Binders

Exxon Exact™ 4006—an ethylene based (co)polymer available from Exxon Chemical Company, Polymers Group, A Division of Exxon Corp., Houston, Tex.) which was cryoground, using standard procedures, to an average particle size of 140 μm.

3M Scotchcast™ 265 Epoxy (Stock #80-7002-6502-0)—an average particle size of 44 μm, available from 3M, St. Paul, Minn.

Morthane™ polyurethane resin—(P8455-200, available from Morton Thermoplastic Polyurethane Polymers Group, Seabrook, N.H.), which was cryoground, using standard procedures, to 120–160 μm, mean particle diameter size particles.

EXAMPLES 1–85

Sorbent particles and binder particles were mixed in the ratios indicated in Table 1 as follows:

Filter material blends utilizing the Exxon Exact™ 4006 polyethylene binder were prepared by heating the sorbent particles to 85–90° C. for approximately 15 minutes in a circulating air oven, adding the Exxon 4006 particles to the hot sorbent particles, and blending to produce a uniform mixture of sorbent particles with attached binder particles. After cooling to ambient temperatures the binder/sorbent particle mixture was passed through a number 20 sieve (mesh size 0.85 mm×0.85 mm) to break up and/or remove larger agglomerated clumps. The sieved filter material was used without further processing.

Filter material blends utilizing the Morthane™ polyurethane binder were prepared by heating the sorbent particles to approximately 170° C. for approximately 15 minutes in a circulating air oven, adding the Morthane™ polyurethane particles to the hot sorbent particles, and blending to produce a uniform mixture. After cooling to ambient temperatures the binding/sorbent particle filter material blend was processed through a number 20 sieve as described above.

Filter material blends utilizing the Scotchcast™ epoxy binder were prepared by blending the sorbent and epoxy particles for approximately 10 minutes at ambient temperatures to produce a uniform sorbent/binder particle filter material blend.

Figure 5:
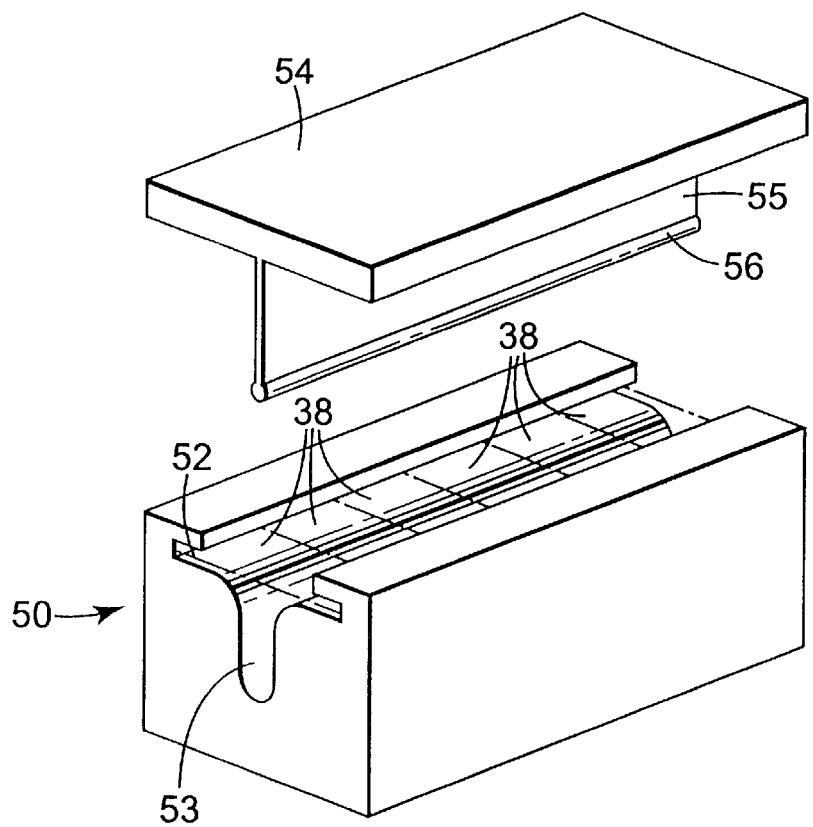
FIG. 5 is a perspective view of a jig for use in deforming a sorbent filter as shown in FIG. 1.
Figure 6:
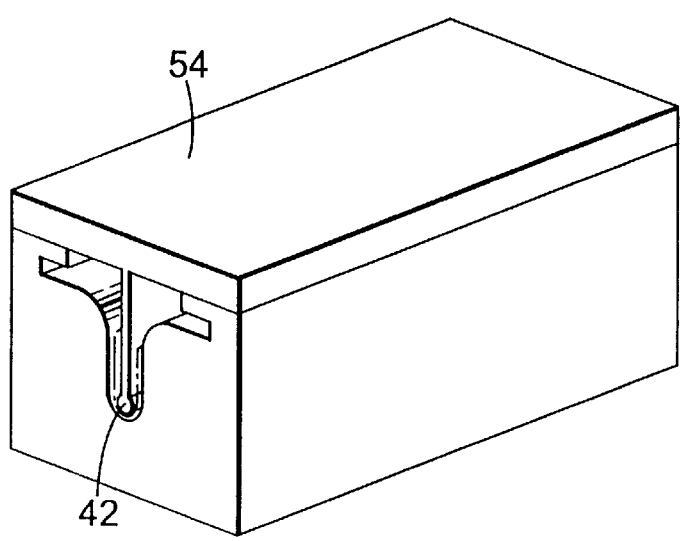
FIG. 6 is a perspective view of a jig being used to deform a sorbent filter as shown in FIG. 5.

The carbon/binder filter material blends (0.5 gm per shaped body) were subsequently packaged in hand made tubular structures approximately 12 mm×36 mm (½ inch× 1½ inch) formed from scrim laminated polytetrafluoroethylene (PTFE) film (available from BHA Technologies, Inc., Kansas City, Mo.). One open end of the tubular structures were heated sealed, the tubes were then filled and the opposite open end sealed to provide complete containment of the loose fill material in precursor sorbent filters. The filled tubular structures precursor sorbent filters were converted into u-shaped sorbent filters using a "T-shaped" channel jig assembly 50 as shown in FIG. 5 (2 mm wide×20 mm long top member and a nominally 8 mm wide×22 mm tall vertical member) which held the tubular structures during heating and allowed subsequent formation of the heated tubular structure into a U-shape. The precursor filters were inserted into the top member 52 of the T channel and the assembly placed in a circulating air oven 41 maintained at 105° C. for approximately two (2) minutes. The jig assembly 50 was subsequently removed from the oven and the tubular structure precursor sorbent filters 38 formed into a U-shaped sorbent filter 42 (12 mm×18 mm–½ inch×¾ inch) by deforming the tubular structure 38 within the vertical cavity member 53 of the jib assembly 50 using a 2 mm wide×20 mm tall blade 55 having a rounded edge 56 (approximately 2 mm diameter). The jig assembly 50 was then cooled to room temperature, the three dimensional shaped sorbent filter 42 was removed from the jig and characterized relative to its restoring energy, moisture absorption and carbon tetrachloride adsorption performance as described above, the results of which are reported in Tables 2–4 below.

TABLE 1

Sorbent/Binder Compositions
(Example Nos. in Bold)

| | | | Binder | | |
|---|---|---|---|---|---|
| Example | Sorbent | Wt. % Binder | Exxon Exact 4006 | Scotchcast 265 | Morthane Polyurethane |
| 1–3 | BAC G-70R | 1 | 1 | 2 | 3 |
| 4–6 | BAC G-70R | 3 | 4 | 5 | 6 |
| 7–9 | BAC G-70R | 5 | 7 | 8 | 9 |
| 10–12 | BAC G-70R | 10 | 10 | 11 | 12 |
| 13–15 | BAC G-70R | 15 | 13 | 14 | 15 |
| 16–18 | BAC G-70R | 20 | 16 | 17 | 18 |
| 19–21 | BAC G-70R | 30 | 19 | 20 | 21 |
| 22–24 | Treated BAC G-70R | 1 | 22 | 23 | 24 |
| 25–27 | Treated BAC G-70R | 3 | 25 | 26 | 27 |
| 28–30 | Treated BAC G-70R | 5 | 28 | 29 | 30 |
| 31–33 | Treated BAC G-70R | 10 | 31 | 32 | 33 |
| 34–36 | Treated BAC G-70R | 15 | 34 | 35 | 36 |
| 37–39 | Treated BAC G-70R | 20 | 37 | 38 | 39 |
| 40–42 | Treated BAC G-70R | 30 | 40 | 41 | 42 |
| 43–45 | GG, 25x45 | 1 | 43 | 44 | 45 |
| 46–48 | GG, 25x45 | 3 | 46 | 47 | 48 |
| 49–51 | GG, 25x45 | 5 | 49 | 50 | 51 |
| 52–54 | GG, 25x45 | 10 | 52 | 53 | 54 |
| 55–57 | GG, 25x45 | 15 | 55 | 56 | 57 |
| 58–60 | GG, 25x45 | 20 | 58 | 59 | 60 |
| 61–63 | GG, 25x45 | 30 | 61 | 62 | 63 |
| 64–66 | GG, 16x35 | 1 | 64 | 65 | 66 |
| 67–69 | GG, 16x35 | 3 | 67 | 68 | 69 |
| 70–72 | GG, 16x35 | 5 | 70 | 71 | 72 |
| 73–75 | GG, 16x35 | 10 | 73 | 74 | 75 |
| 76–78 | GG, 16x35 | 15 | 76 | 77 | 78 |
| 79–81 | GG, 16x35 | 20 | 79 | 80 | 81 |
| 82–84 | GG, 16x35 | 30 | 82 | 83 | 84 |
| 85 | GG, 12x20 | 10 | — | — | 85 |
| 86 | GG, 12x20 | 17 | — | — | 86 |

TABLE 2

Shape Retention
[% Shape Retention (Example No.)]

| | | | Binder | |
|---|---|---|---|---|
| Example | Sorbent | Wt. % Binder | Exxon Exact 4006 | Scotchcast 265 |
| 22 | Treated BAC G-70R | 1 | 29.9% (22) | — |
| 25–26 | Treated BAC G-70R | 3 | 40.6% (25) | 34.8% (26) |
| 28 | Treated BAC G-70R | 5 | 41.2% (28) | — |
| 31 | Treated BAC G-70R | 10 | 49.3% (31) | — |
| 34–35 | Treated BAC G-70R | 15 | 61.5% (34) | 29.0% (35) |
| 37 | Treated BAC G-70R | 20 | 51.8% (37) | — |
| 40–41 | Treated BAC G-70R | 30 | 65.4% (40) | 26.3% (42) |
| 43 | GG, 25x45 | 1 | 20.9% (43) | — |
| 46–47 | GG, 25x45 | 3 | 34.5% (46) | 24.1% (47) |
| 49–50 | GG, 25x45 | 5 | 29.1% (49) | 26.8% (50) |

TABLE 2-continued

Shape Retention
[% Shape Retention (Example No.)]

| | | | Binder | |
|---|---|---|---|---|
| Example | Sorbent | Wt. % Binder | Exxon Exact 4006 | Scotchcast 265 |
| 52 | GG, 25x45 | 10 | 36.5% (52) | — |
| 55–56 | GG, 25x45 | 15 | 47.9% (55) | 25.6% (56) |
| 58 | GG, 25x45 | 20 | 44.7% (58) | — |
| 61 | GG, 25x45 | 30 | 51.7% (61) | — |

TABLE 3

Moisture Adsorption
Wt. % H$_2$O Adsorbed based on Shaped Sorbent Filter Wt.
[% Water Adsorbed (Example No.)]

| | | | Binder | |
|---|---|---|---|---|
| Example | Sorbent | Wt. % Binder | Exxon Exact 4006 | Scotchcast 265 |
| 22 | Treated BAC G-70R | 1 | 43.9% (22) | — |
| 25–26 | Treated BAC G-70R | 3 | 42.6% (25) | 40.6% (26) |
| 28–29 | Treated BAC G-70R | 5 | 42.3% (28) | 40.5% (29) |
| 31 | Treated BAC G-70R | 10 | 40.5% (31) | — |
| 34 | Treated BAC G-70R | 15 | 36.9% (34) | — |
| 37 | Treated BAC G-70R | 20 | 38.7% (37) | — |
| 40–41 | Treated BAC G-70R | 30 | 32.7% (40) | 35.3% (41) |
| 43 | GG, 25x45 | 1 | 48.5% (43) | — |
| 46–47 | GG, 25x45 | 3 | 48.6% (46) | 47.7% (47) |
| 49 | GG, 25x45 | 5 | 47.6% (49) | — |
| 52 | GG, 25x45 | 10 | 45.0% (52) | — |
| 55–56 | GG, 25x45 | 15 | 43.6% (55) | 44.3% (56) |
| 58 | GG, 25x45 | 20 | 39.5% (58) | — |
| 61–62 | GG, 25x45 | 30 | 33.3% (61) | 42.1% (62) |

TABLE 4

Carbon Tetrachloride Adsorption Data
Wt. % CCl$_4$ Adsorbed based on the Shaped Sorbent Filter Wt.
[% CCl$_4$ Adsorbed (Example No.)]

| | | | Binder | |
|---|---|---|---|---|
| Example | Sorbent | Wt. % Binder | Exxon Exact 4006 | Scotchcast 265 |
| 22 | Treated BAC G-70R | 1 | 74.1% (22) | — |
| 25–26 | Treated BAC G-70R | 3 | 73.0% (25) | 66.2% (26) |
| 28–29 | Treated BAC G-70R | 5 | 72.9% (28) | 65.0% (29) |
| 31 | Treated BAC G-70R | 10 | 73.2% (31) | — |
| 34–35 | Treated BAC G-70R | 15 | 66.2% (34) | 60.1% (35) |
| 37 | Treated BAC G-70R | 20 | 65.2% (37) | — |
| 40–41 | Treated BAC G-70R | 30 | 60.1% (40) | 57.4% (41) |
| 43 | GG, 25x45 | 1 | 84.8% (43) | — |
| 46–47 | GG, 25x45 | 3 | 85.7% (46) | 71.5% (47) |
| 49–50 | GG, 25x45 | 5 | 84.6% (49) | 75.1% (50) |
| 52 | GG, 25x45 | 10 | 77.9% (52) | — |
| 55–56 | GG, 25x45 | 15 | 74.8% (55) | 66.2% (56) |
| 58 | GG, 25x45 | 20 | 77.7% (58) | — |
| 61–62 | GG, 25x45 | 30 | 63.7% (61) | 53.4% (62) |

The data in Tables 2–4 suggest that a broad range of binder and sorbent materials can be used to prepare consolidated sorbent bodies. Restoring energy for the shaped sorbent filter can be adjusted over a rather broad range by increasing or decreasing the amount of binder material and/or binder type to optimize the properties of the shaped sorbent filter for a specific application. Generally speaking, constructions based on the polyethylene binder showed greater respective energy or shape retention at higher binder content but at the exposure of lower sorptive capacity. Constructions based on polyethylene binders were also more resilient than constructions based on the epoxy binder.

EXAMPLE 87

A number of loose fill tubular structures of Example 10 were placed on a tray and heated at 105° C. for approximately two (2) minutes. On removal from the oven the hot pouches were formed into a variety of shapes, including "j", "s", "o", "v", "l", "w", "z", and "c" shapes, as well as a twisted rod shape, by manually forming the tubular structure into the desired shape and maintaining it in that shape until it had cooled to ambient temperature.

This example demonstrates the versatility of the loose fill approach to form sorbent shaped filter constructions in that a wide range of over-wrapped constructions can be easily and conveniently fabricated from the loose fill tubular structures.

We claim:

1. A method of forming a small electrical or optical device sorbent filter comprising:
    a) providing a porous flexible tubular web structure having two open ends;
    b) sealing a first end of the tubular web structure;
    c) filling the sealed tubular web structure with flowable filter material of sorbent material and binder;
    d) sealing the opposite open end of the tubular web structure;
    e) heating the tubular web structure to activate the binder and form a sorbent filter.

2. The method of claim 1 wherein the tubular web structure is formed from a web of porous film.

3. The method of claim 1 wherein the tubular web structure is formed from a non-shedding nonwoven web.

4. The method of claim 1 wherein the tubular web structure is formed of a porous flexible web containing thermoplastic material.

5. The method of claim 4 wherein the tubular web structure is provided by folding a flat porous flexible web along a longitudinal axis and edge sealed.

6. The method of claim 1 wherein the open ends of the tubular web structure are heat sealed.

7. The method of claim 1 wherein the sorbent material is a particulate material and is heated to a temperature above the softening temperature of the binder and blended with the binder to cause the binder to adhere to the surface of the particulate sorbent material, which pre-blended flowable filter material mixture is filled into the end sealed tubular web structure.

8. The method of claim 4 wherein the sorbent material is activated carbon and the binder is a thermoplastic particulate binder having an average particle size less than that of the sorbent material.

9. The method of claim 1 wherein the tubular web structure has an effective width of less than 3 cm.

10. The method of claim 1 wherein the tubular web structure has an effective width of less than 2 cm.

11. The method of claim 1 further comprises the step of deforming the filled tubular web structure to have at least one bending portion of an angle of at least 10 degrees prior to or simultaneously with the heating step thereby forming a three dimensional shaped sorbent filter.

12. The method of claim 11 wherein the bending portion angle is at least 45 degrees.

13. The method of claim 11 wherein the filled tubular web structure is deformed to have at least two bending portions.

* * * * *

UNITED STATES PATENT AND TRADEMARK OFFICE
CERTIFICATE OF CORRECTION

PATENT NO. : 6,270,609 B1
DATED : August 7, 2001
INVENTOR(S) : Markell, Craig G.

It is certified that error appears in the above-identified patent and that said Letters Patent is hereby corrected as shown below:

<u>Column 3,</u>
Line 44, delete "38" and insert -- 30 --.

<u>Column 4,</u>
Line 24, after "molded" and before "44", please insert -- 40, --.

<u>Column 7,</u>
Line 61, please delete "jib" and insert -- jig --.

Signed and Sealed this

First Day of October, 2002

Attest:

JAMES E. ROGAN
Attesting Officer
Director of the United States Patent and Trademark Office